Dec. 7, 1943.     E. H. ANDERSON     2,335,896
SUPPORT FOR MIRRORS OR THE LIKE
Filed June 28, 1940     2 Sheets-Sheet 1
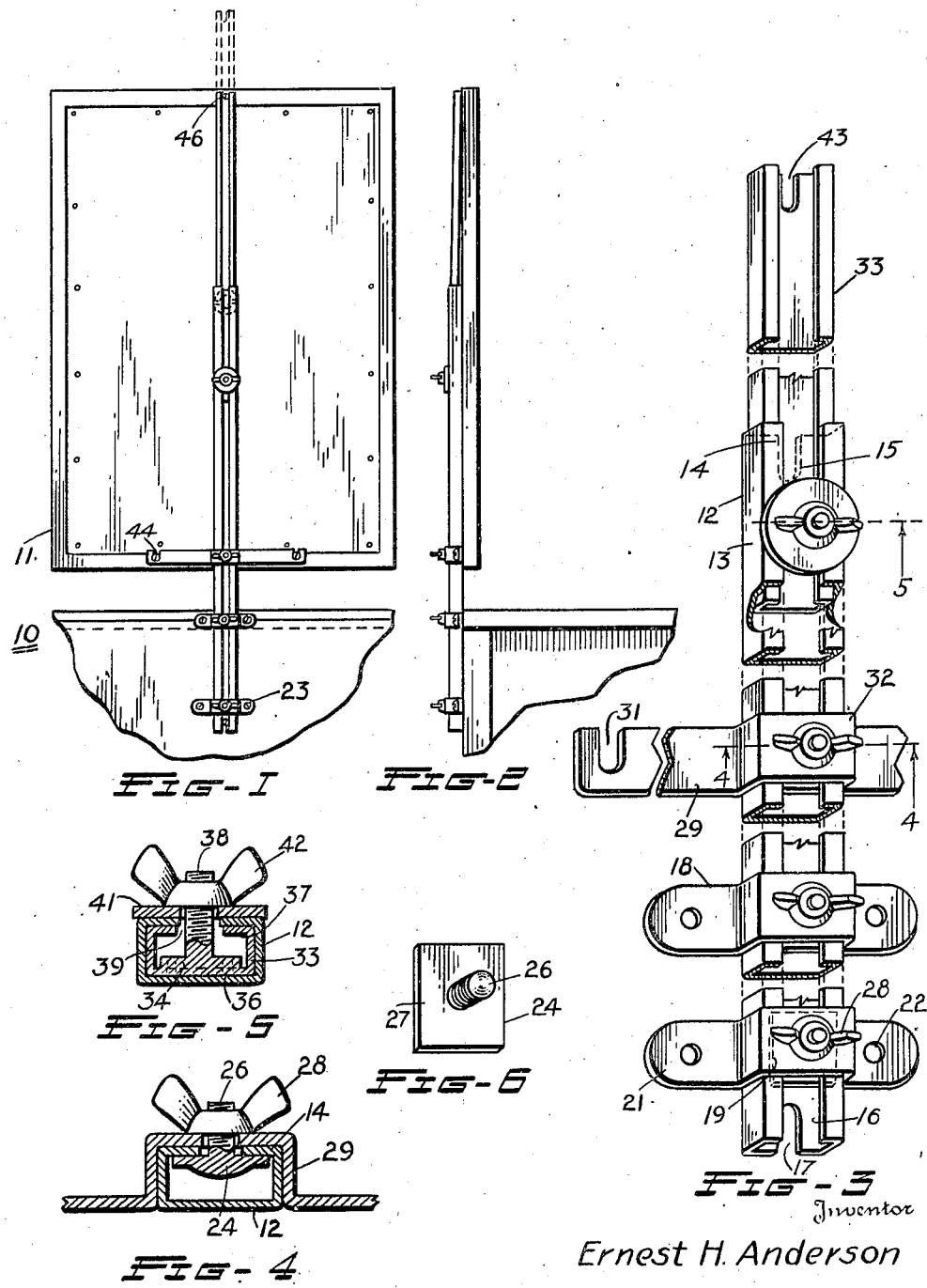
Inventor
Ernest H. Anderson Dec. 7, 1943.　　　E. H. ANDERSON　　　2,335,896
SUPPORT FOR MIRRORS OR THE LIKE
Filed June 28, 1940　　2 Sheets-Sheet 2
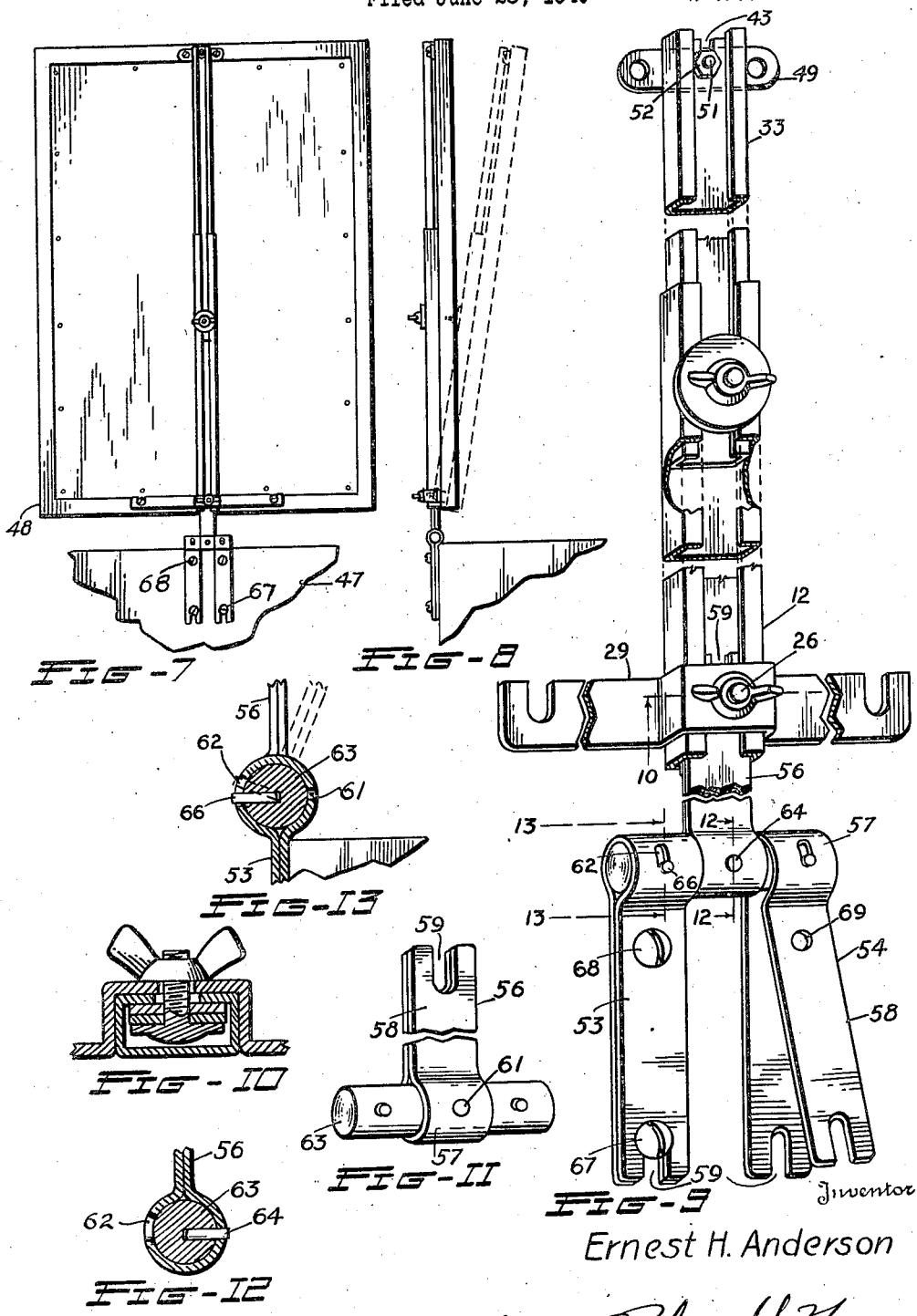
Inventor
Ernest H. Anderson

Patented Dec. 7, 1943

2,335,896

UNITED STATES PATENT OFFICE 2,335,896

SUPPORT FOR MIRRORS OR THE LIKE

Ernest H. Anderson, Jamestown, N. Y.

Application June 28, 1940, Serial No. 343,000

5 Claims. (Cl. 248—276)

This invention relates to improvements in supports for mirrors or the like.

A preferred form of the invention is directed to the provision of a support that may mount a mirror above a dresser, bureau, vanity table, or similar article in a convenient manner of use.

One of the objects of the invention lies in the provision of a mirror support that is of simple construction, inexpensive to manufacture and may be readily set up without the aid of special tools or equipment.

Another object of the invention lies in the provision of a single support for a mirror that is centrally disposed and relatively inconspicuous.

Another object of the invention lies in the provision of a support for a mirror that is rugged and capable of sustaining the weight of as large and heavy a mirror as may be required for dressers, vanity tables, and similar articles.

Another object of the invention lies in the provision of a mirror support that may be readily adjusted to mount mirror of different sizes and at different heights with respect to the article with which it is to be used.

Another object of the invention lies in the provision of a support that enables tilting or adjusting a mirror out of vertical position to an extent within ordinarily desirable limits.

Other and further objects of the invention will be more fully understood from a consideration of the following specification, taken in conjunction with the accompanying drawings; and in which Figure 1 is a rear elevational view of one modification of the support in position of use;

Figure 2 is a side elevational view of the structure shown in Figure 1;

Figure 3 is an enlarged perspective view of the mirror support;

Figure 4 is a transverse sectional view taken substantially on the line 4—4 of Figure 3;

Figure 5 is a further transverse sectional view taken substantially on the line 5—5 of Figure 3;

Figure 6 is a perspective view of a part of one of the clamping elements;

Figure 7 is a rear elevational view of a modification of the invention in position of use;

Figure 8 is a side elevational view of the structure of Figure 7;

Figure 9 is an enlarged perspective view of the modified support;

Figure 10 is a transverse sectional view taken substantially on the line 10—10 of Figure 9;

Figure 11 is a perspective view of a part of the pivotal structure shown in Figure 9;

Figure 12 is a sectional view taken substantially on the line 12—12 of Figure 9; and Figure 13 is a further sectional view taken substantially on the line 13—13 of Figure 9.

Referring to the drawings, the numeral 10 is employed to generally designate an article of furniture, such as a bureau, chest, dresser, vanity table, or the like, to which is secured a mirror 11. It has increasingly become the practice in the manufacture of articles of furniture, used in conjunction with mirrors, to eliminate the conventional supporting posts and provide instead a concealed or nearly concealed support that does not detract from the appearance of the article and mirror.

One form of the present invention is clearly disclosed in Figure 3 of the drawings, and comprises a channel member 12, the side walls 13 of which terminate in inwardly directed flanges 14 that together form a slot or groove 15 extending the full channel length. The ends of the base wall 16 of the channel may be formed with open ended slots 17. The channel 12 may be attached to the article of furniture by suitable brackets 18, such, for example, as those disclosed in the drawings. These brackets are strap like, and have a central U-shaped portion 19 that contacts sides 13 and flanges 14. The ends 21 of the bracket are substantially flush with the channel base wall 16, being suitably apertured, as at 22, to receive screws 23 for attachment to the article. Each bracket 18 is secured at any desired position on the channel 12 by a clamp member 24. This member consists of a bolt having a threaded shank 26 and a rectangular head 27. The head is proportioned to fit within the channel 12 and engage the flanges 14 thereof. The shank 26 projects outwardly of the channel through the groove 15 and a suitable opening in the portion 19 of the bracket. A wing nut 28 may be engaged with the shank 26 and when turned down causes the flanges 14 of the channel to be clamped between the portion 19 and the head 27.

A further bracket 29 is carried by the channel 12, being engageable with the lower end of the mirror 11. This bracket may be of greater length than the bracket 18 and includes open ended slots 31 adjacent its ends. The central portion 32 of this bracket, together with its means of securement on the channel 12, may, for all practical purposes, be identical with the portion 19 and clamping means of bracket 18.

Mirror sizes vary considerably, depending on the style and size of the articles with which they are used, and therefore it is desirable to provide a support that is fully adaptable. The channel member 12 is adapted to have telescoping engagement with a further channel member 33. This channel member may be identical in all respects, except for size, and is freely slidable in the channel 12. A flat headed bolt 34 may be permanently joined, as by welding, to the base wall 36 of the channel 33, or to the flanges 37 of said channel, as may be found most suitable. The shank 38 of the bolt 34 projects through groove 39 of channel 33 and groove 15 of channel 12. A washer 41 may be mounted on the flanges 14 and a wing nut 42 secures the channel against relative movement. The channel member 33 may be provided with an open ended slot 43 in the end of the base wall 36.

When it is desired to mount a mirror on an article of furniture by means of the support above described, it may be desirable to first locate and secure brackets 18 to the article. As indicated in Figure 1 of the drawings, the uppermost bracket 18 is secured slightly beneath the article top and the lower bracket is secured to a concealed supporting member within the article. Since the brackets 18 are not required to be spaced any given distance apart, the lower one may be so located that it will engage a part of the frame of the article. Thus, no braces or other parts need be attached to the article for the purpose of mounting the support. The bracket 29 is preferably secured to the lower rail of the mirror frame through the use of screws 44 projecting through slots 31. A screw 46 may be partially engaged with the upper rail of the mirror frame. The channel 12 is projected through brackets 18 and made fast by turning down wing nuts 23. The mirror bracket 29 may now be engaged with the channel 12 and temporarily secured at the desired level above the article top by turning down a further wing nut 28. The channel 33 may now be engaged with channel 12, or, if previously so engaged, is adjusted to a position such that the open ended slot 43 projects under the screw 46 of the mirror. The wing nut 42 of the channel clamp is turned down, screw 46 tightened, and the mirror is secured in place.

Through the use of telescoping channels 12 and 33, together with brackets 18 and 29, it is possible to mount a mirror of almost any conventional size at any desired height above the top of an article of furniture, since it is possible to adjust the channel 12 with respect to brackets 18 and 29, as well as to extend or retract the channel 33 with respect to channel 12. In some instances, with mirrors of considerably less height than the one illustrated in the drawings, it may be convenient to remove the channel 33 and utilize only the channel 12. Under these circumstances, the screw 46, at the top of the mirror, would be engaged with the open ended slot 17 in the upper end of the channel 12. The mirror height being fixed and the desired spacing between the lower edge of the mirror and the article top also being determined, the channel 12, if too long, can project downwardly beneath the lowermost bracket 18 to a more or lesser degree than indicated in the drawings.

Reference is now had to a modification of the invention shown in Figures 7 to 13, inclusive. Herein an article of furniture is indicated by the numeral 47. A mirror 48 is adapted to be mounted above the article 47 and has secured thereto the channel member 12 and extensible channel member 33 above described. To facilitate attaching the channel members 12 and 33 to the mirror, it may be found convenient to first secure bracket 29 to the lower mirror rail and a plate 49 to the upper mirror rail. This plate is provided with an outwardly extending threaded shank 51, substantially as shown in Figure 9. The channel member 12 is projected into the bracket 29, the lower end being substantially flush with the lower edge of the mirror. The channel member 33 is extended to engage shank 51 with the slot 43. A suitable nut 52 secures channel 33 to plate 49. With the exception of the substitution of plate 49 for the screw 46 of the previous modification, it will be noted that channels 12 and 33 are similarly engaged with the mirror in both modifications.

In this modification, it is contemplated to provide for tilting the mirror 48 within ordinarily desirable limits. To this end, a controllable hinge unit is provided that consists of three elements. For practical purposes of manufacture, these elements may be identical. However, for a clearer understanding of the invention, they are separately designated as straps 53, 54, and 56. Each strap consists of a cylindrical portion 57 connecting flat strips 58. The strips may be of the same length and formed with coinciding open ended slots 59. On diametrically opposite sides of the cylindrical portion 57 is an opening 61 and a slot 62. The strips 58 of straps 56 are adapted to project into the lower end of channel 12, slots 59 receiving the shank 26 of the clamp for the bracket 29. When the wing nut 28 is turned down, the strips 58 and channel 12 are clamped to the bracket 29. A shaft 63 is projected through the opening formed by the cylindrical portion 57. This shaft has a radial opening which, when in registry with the opening 61 of strap 56, receives a pin 64. Relative rotation of the shaft and strap 56 is thus prevented. The cylindrical portions 57 of straps 53 and 54 are mounted on the ends of shaft 63. These straps are so positioned that the slots 62 face in a direction opposite from the opening 61 of the strap 56. One or more further radial openings are provided in the shaft 63 and these openings, when in registry with slot 62, receive pins 66. The possible travel of pin 66 in slot 62 determines the relative rotation of strap 56 with respect to straps 53 and 54.

In the assembly of the modification above described it is preferable to first secure channels 12 and 33 to the mirror 48. At the time channel 12 is engaged with bracket 29, strap 56, together with shaft 63, is also secured to the channel and bracket (see Figure 11). The cylindrical portions 57 of straps 53 and 54 may be engaged with the ends of the shaft 63, and at such time pins 66 are mounted, as already described. It is contemplated that pins 64 and pins 66 may be first positioned on the shaft 63 before applying the straps. This can be readily accomplished by spreading apart the strips 58 a sufficient distance to allow entrance of the shaft 63 in the open side of the cylindrical portion 57. When these straps 53 and 54 have been assembled, suitable screws 67 engage the rear wall of the article 47 through slots 59. By reason of these slots, the mirror and support may be slightly adjusted to properly locate the cylindrical portions 57 of the straps with respect to the top of the article 47. Screws 67 may be turned down to secure the straps in place and additional screws 68, projecting through strap openings 69, draw the strips 58 together and cause the cylindrical portions 57 to frictionally engage the shaft 63. It is pointed out that the inside diameter of the cylindrical portions 57 is preferably slightly less than the diameter of the shaft 63 and, thus, when the screws 68 are turned down, the portions 57 have sufficient frictional engagement with the shaft 63 to secure the mirror against tilting. Should screws 68 become loosened for any reason, the mirror can only tilt to the extent of travel of pins 66 in slots 62, this being clearly indicated in Figure 8 of the drawings. It is contemplated that the extent of tilt of the mirror 48 is sufficient for ordinary purposes. However, it is obvious that this could be increased or decreased by alteration of the length of slot 62.

Although applicant has shown and described only two modifications of his mirror support, it will be apparent to those skilled in the art that variations of the structure for different types of mirrors and the like may be made without departing from the spirit and scope of the invention as set forth in the hereunto annexed claims.

Having thus set forth my invention what I claim as new and for which I desire protection by Letters Patent is:

1. A support for mounting a mirror on an article of furniture comprising an elongated channel member, the side walls of said member being flanged to form a restricted opening into the interior thereof, a bracket attachable to the rear of said mirror, a central portion of said bracket being laterally offset and cooperating with the rear of said mirror when attached thereto to provide an enclosure through which said channel member projects, clamping means on said bracket engageable with the flanged side walls of said channel member at any point intermediate its ends, said clamping means and said bracket serving to secure said channel member in abutment with the rear of said mirror, and means attachable to the article of furniture, said channel member being securable to said means whereby to mount said mirror.

2. A support for mounting a mirror on an article of furniture comprising a channel member, a bracket attachable to the rear of said mirror, clamping means on said bracket engageable with said channel member, a hinge member including relatively rotative parts, one of said parts being projected into said channel member and secured by said clamping means, another of said parts being attachable to said article, means on said parts cooperating to limit relative rotation thereof, and further means for controlling the freedom of rotation of said parts within the limits prescribed by said means.

3. A support for mounting a mirror on an article of furniture comprising a channel member, the side walls of said member being flanged to form a restricted opening into the interior thereof, a bracket attachable to the rear of said mirror, a central portion of said bracket being laterally offset and cooperating with the rear of said mirror to provide an enclosure through which said channel member projects when applied to said mirror, clamping means on the offset portion of said bracket engageable with the flanged side walls of said channel member to secure said bracket and said channel member in any given relative position, and means attachable to the article of furniture, said channel being securable to said means whereby to mount said mirror on said article.

4. A support for mounting a mirror on an article of furniture comprising a channel member having extendable parts adapted to become coextensive with a mirror of given height, a clamping member carried by and operable to secure said parts in extended position, a bracket attachable to the rear of said mirror, a central portion of said bracket being laterally offset and cooperating with the rear of said mirror to provide an enclosure through which at least one of the parts of said channel member projects, clamping means on said bracket engageable with the flanged side walls of said channel member, said clamping means and said bracket serving to secure the engaged part of said channel member in abutment with the rear of said mirror and against adjustment with respect to said bracket and means attachable to the article of furniture, one of the parts of said channel member being securable to said means whereby to mount said mirror on said article.

5. A support for mounting a mirror on an article of furniture comprising a hollow member, at least a part of said member being of the nature of a channel, the side walls of the channel portion of said member forming a restricted opening into the interior thereof, a bracket attachable to the rear of said mirror, a central portion of said bracket being laterally offset and cooperating with the rear of the mirror to provide an enclosure through which said hollow member projects when applied to said mirror, clamping means on the offset portion of the bracket engageable with the side walls of the channel portion of said member to secure said bracket and said member in given relative position, and means attachable to the article of furniture, said member being securable to said means whereby to mount said mirror on said article.

ERNEST H. ANDERSON.